United States Patent
Harris

(10) Patent No.: US 10,834,790 B2
(45) Date of Patent: Nov. 10, 2020

(54) METHOD FOR MAKING CERAMIC MATRIX COMPOSITE ARTICLES WITH PROGRESSIVE MELT INFILTRATION

(71) Applicant: Rolls-Royce High Temperature Composites, Inc., Huntington Beach, CA (US)

(72) Inventor: Stephen Isaiah Harris, Long Beach, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 476 days.

(21) Appl. No.: 14/974,895

(22) Filed: Dec. 18, 2015

(65) Prior Publication Data

US 2016/0175960 A1    Jun. 23, 2016

Related U.S. Application Data

(60) Provisional application No. 62/095,585, filed on Dec. 22, 2014.

(51) Int. Cl.
*B23K 9/04* (2006.01)
*H05B 6/80* (2006.01)
(Continued)

(52) U.S. Cl.
CPC .............. *H05B 6/80* (2013.01); *C04B 35/117* (2013.01); *C04B 35/185* (2013.01); *C04B 35/488* (2013.01); *C04B 35/52* (2013.01); *C04B 35/522* (2013.01); *C04B 35/573* (2013.01); *C04B 35/583* (2013.01); *C04B 35/584* (2013.01); *C04B 35/62863* (2013.01); *C04B 35/62868* (2013.01); *C04B 35/62884* (2013.01); *C04B 35/62894* (2013.01); *C04B 35/803* (2013.01); *C04B 35/806* (2013.01); *B23K 2103/08* (2018.08); *C04B 2235/3826* (2013.01); *C04B 2235/40* (2013.01); *C04B 2235/402* (2013.01); *C04B 2235/404* (2013.01); *C04B 2235/42* (2013.01); *C04B 2235/428* (2013.01); *C04B 2235/5244* (2013.01); *C04B 2235/5472* (2013.01); *C04B 2235/6023* (2013.01); *C04B 2235/616* (2013.01); *C04B 2235/66* (2013.01); *C04B 2235/665* (2013.01)

(58) Field of Classification Search
None
See application file for complete search history.

(56) References Cited

U.S. PATENT DOCUMENTS 3,785,801 A * 1/1974 Benjamin ................. B22F 9/04
75/255
3,864,154 A * 2/1975 Gazza ................... C04B 41/009
428/539.5

(Continued)

*Primary Examiner* — Ibrahime A Abraham
*Assistant Examiner* — Gyounghyun Bae
(74) *Attorney, Agent, or Firm* — Shumaker & Sieffert, P.A.

(57) ABSTRACT

A method of melt infiltrating a green ceramic matrix composite (CMC) article, wherein the green CMC article includes a ceramic reinforcing structure. The method includes heating a localized region of the green CMC article; melting a metal alloy infiltrant to form a molten metal alloy; and introducing the molten metal alloy into the localized region to infiltrate the reinforcing structure of the green CMC article with the metal alloy infiltrant and form the CMC article.

10 Claims, 2 Drawing Sheets

(51) Int. Cl.
*B23K 9/23* (2006.01)
*B23K 26/00* (2014.01)
*B23K 26/34* (2014.01)
*B23K 15/00* (2006.01)
*C04B 35/628* (2006.01)
*C04B 35/583* (2006.01)
*C04B 35/52* (2006.01)
*C04B 35/488* (2006.01)
*C04B 35/80* (2006.01)
*C04B 35/117* (2006.01)
*C04B 35/185* (2006.01)
*C04B 35/573* (2006.01)
*C04B 35/584* (2006.01)
*B23K 103/08* (2006.01)

(56) References Cited

U.S. PATENT DOCUMENTS

| | | | | |
|---|---|---|---|---|
| 4,585,618 A | * | 4/1986 | Fresnel | C04B 35/65 204/242 |
| 4,657,876 A | * | 4/1987 | Hillig | C04B 35/553 264/257 |
| 4,698,236 A | * | 10/1987 | Kellogg | H01J 37/3178 250/492.2 |
| 4,737,476 A | * | 4/1988 | Hillig | C04B 35/195 427/376.2 |
| 4,961,990 A | * | 10/1990 | Yamada | C04B 35/62227 428/323 |
| 5,017,334 A | * | 5/1991 | Claar | C04B 35/56 419/12 |
| 5,210,944 A | | 5/1993 | Monson et al. | |
| 5,221,647 A | * | 6/1993 | Hida | C04B 35/111 501/98.1 |
| 5,366,686 A | | 11/1994 | Mortensen et al. | |
| 5,431,967 A | * | 7/1995 | Manthiram | B22F 3/004 427/197 |
| 5,703,341 A | | 12/1997 | Lowndes et al. | |
| 5,840,221 A | * | 11/1998 | Lau | B28B 1/265 264/29.7 |
| 5,846,057 A | | 12/1998 | Ferrigno et al. | |
| 5,878,849 A | * | 3/1999 | Prunier, Jr. | C04B 35/563 188/251 A |
| 5,928,448 A | * | 7/1999 | Daws | B23P 6/00 156/92 |
| 6,051,277 A | | 4/2000 | Claussen et al. | |
| 6,228,453 B1 | * | 5/2001 | Fareed | B32B 18/00 428/403 |
| 6,245,424 B1 | * | 6/2001 | Lau | B28B 1/265 428/368 |
| 6,347,446 B1 | | 2/2002 | Luthra et al. | |
| 6,441,341 B1 | | 8/2002 | Steibel et al. | |
| 6,670,026 B2 | | 12/2003 | Steibel et al. | |
| 6,723,279 B1 | * | 4/2004 | Withers | A63B 53/04 419/27 |
| 6,733,907 B2 | | 5/2004 | Morrison et al. | |
| 6,820,334 B2 | * | 11/2004 | Kebbede | B23P 6/005 29/889.1 |
| 6,960,738 B2 | | 11/2005 | Weekamp et al. | |
| 8,105,967 B1 | * | 1/2012 | Martin | A61L 27/427 501/97.4 |
| 8,715,435 B2 | * | 5/2014 | Roberts, III | C04B 37/001 156/293 |
| 9,512,505 B2 | * | 12/2016 | Weaver | C04B 41/52 |
| 9,527,170 B2 | * | 12/2016 | Czerner | B23K 26/34 |
| 9,701,072 B2 | * | 7/2017 | Corman | B23P 6/045 |
| 2003/0196305 A1 | * | 10/2003 | Kebbede | F01D 5/282 29/402.11 |
| 2004/0121182 A1 | | 6/2004 | Hardwicke et al. | |
| 2004/0219290 A1 | * | 11/2004 | Nagaraj | C23C 4/00 427/140 |
| 2004/0238794 A1 | * | 12/2004 | Karandikar | B01J 19/126 252/500 |
| 2005/0074355 A1 | * | 4/2005 | Pickard | C22C 26/00 419/10 |
| 2005/0181209 A1 | * | 8/2005 | Karandikar | B22F 3/1103 428/408 |
| 2008/0229567 A1 | * | 9/2008 | Bublath | B23P 6/005 29/402.11 |
| 2009/0015272 A1 | | 1/2009 | Jones et al. | |
| 2009/0313823 A1 | | 12/2009 | Rockstroh et al. | |
| 2011/0077176 A1 | * | 3/2011 | Smith | C04B 35/04 507/271 |
| 2011/0103940 A1 | * | 5/2011 | Duval | F01D 5/284 415/173.4 |
| 2012/0037604 A1 | | 2/2012 | Shikata | |
| 2013/0022471 A1 | | 1/2013 | Roberts, III et al. | |
| 2013/0205554 A1 | | 8/2013 | Czerner | |
| 2013/0295304 A1 | * | 11/2013 | Moore | C04B 35/6265 428/34.6 |
| 2015/0115489 A1 | * | 4/2015 | Corman | B23P 6/045 264/36.18 |
| 2016/0279744 A1 | * | 9/2016 | Harris | H05B 6/80 |

\* cited by examiner

METHOD FOR MAKING CERAMIC MATRIX COMPOSITE ARTICLES WITH PROGRESSIVE MELT INFILTRATION

This application claims the benefit of U.S. Provisional Application No. 62/095,585 filed Dec. 22, 2014, which is incorporated herein by reference in its entirety.

BACKGROUND

Reinforced ceramic matrix composite articles (CMCs) are well suited for high-temperature structural applications because of their toughness, thermal resistance, high temperature strength and chemical stability. For example, silicon carbide (SiC) matrix composites have been made by infiltrating a silicon carbide slurry into a porous fiber preform to form a green composite article. A molten alloy infiltrant material including silicon (Si) may then be introduced into the green composite article using capillary forces to densify the structure to form a CMC article.

SUMMARY

Melt-infiltration processes for producing CMCs are time consuming, energy intensive batch processes that do not allow in-situ process modifications to account for unexpected deviations. If these processes are conducted in a vacuum, vaporization of the molten metal alloy infiltrant can occur, which can cause non-uniform infiltration and result in defects within the finished article.

In general, the present disclosure is a directed method for making a CMC article in which a localized region of a green composite article is heated with a heat source, and a metal alloy infiltrant is melted and introduced into the heated localized region. The molten metal alloy infiltrant enters and occupies the interstices between the supporting structure of the green ceramic article, and capillary action draws the molten alloy infiltrant into the region until a desired portion of the green composite article is adequately infiltrated with the metal alloy to form a CMC article.

In one aspect, the present disclosure is directed to a method of melt infiltrating a green ceramic matrix composite (CMC) article, wherein the green CMC article includes a ceramic reinforcing structure. The method includes heating a localized region of the green CMC article; melting a metal alloy infiltrant to form a molten metal alloy; and introducing the molten metal alloy into the localized region to infiltrate the reinforcing structure of the green CMC article with the metal alloy infiltrant and form the CMC article.

In another aspect, the present disclosure is directed to a method for making a ceramic composite article, including heating a localized region of the green composite article with a heat source comprising at least one of a laser and an electric arc, wherein the green composite article comprises a ceramic reinforcing structure; melting a metal alloy infiltrant with the heat source to form a molten metal alloy; and moving the heat source with respect to a surface of the article such that the molten metal alloy flows into the localized region and infiltrates interstices between the reinforcing structure.

In yet another aspect, the present disclosure is directed to a method for making a ceramic composite article, including: impregnating an inorganic fiber preform with a slurry composition, wherein the slurry composition comprises a particulate and a carrier liquid; removing substantially all of the carrier liquid to form a green composite article; heating a localized region of the green composite article; melting a metal alloy infiltrant to form a molten metal alloy; and introducing the molten metal alloy into the localized region to infiltrate the reinforcing structure of the green CMC article with the metal alloy infiltrant.

In some embodiments, the method of the present disclosure can be conducted in an inert environment at atmospheric pressure, which can reduce vaporization of the metal alloy infiltrant during the infiltration process. Since a localized region of the green composite article is heated rapidly and directly with the heat source, the speed and energy efficiency of the infiltration process in that region can be improved. Further, in some embodiments process parameters such as, for example, the temperatures to which the infiltrant and the region are heated, and the rate at which the molten infiltrant is introduced into the region, can be modified locally during the infiltration process to more fully fill regions of the green composite article that are difficult to infiltrate.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
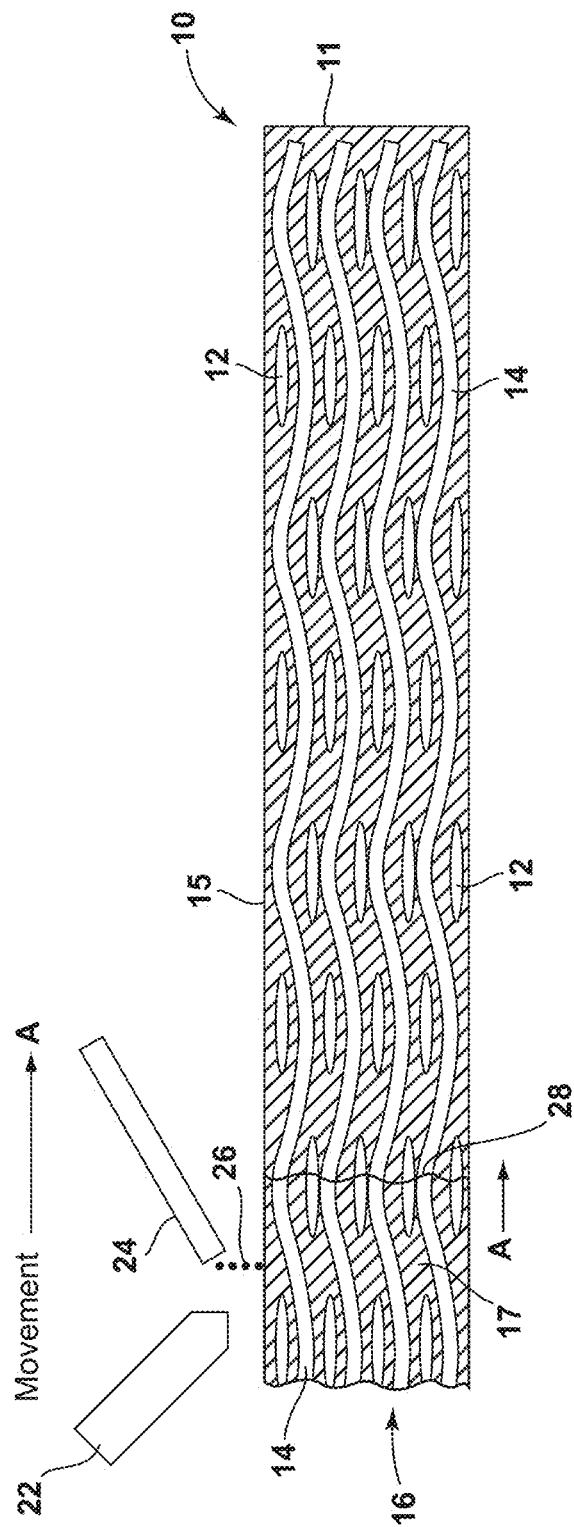
FIG. 1 is a schematic cross-sectional view of a green ceramic article and an embodiment of a process of the present disclosure.

In general, the process for making a composite article begins with the fabrication of a two-dimensional or three-dimensional inorganic fiber preform, which forms a structural scaffold for subsequent incorporation of a ceramic matrix and a molten alloy infiltrant. To make the inorganic fiber preform, chopped fibers, continuous fibers, woven fabrics or combinations thereof are laid up, fixed and shaped into the configuration of a desired component. The fibers in the inorganic fiber preform can be made from any inorganic material that is stable at processing temperatures above about 1000° C. and is compatible with the temperature of the molten alloy infiltrant. Suitable examples include, but are not limited to, aluminum oxide ($Al_2O_3$), mullite ($Al_6Si_2O_{13}$), zirconium oxide ($ZrO_2$), carbon (C), graphite, silicon carbide (SiC), silicon carbon nitride, silicon nitride, and mixtures and combinations thereof. Suitable commercially available inorganic fibers include, for example, preceramic SiC fibers such as those available under the trade designation HI-NICALON and SYLRAMIC from COI Ceramics, Inc., San Diego, Calif.

In some embodiments, the inorganic fibers in the preform may be treated by applying a coating or coatings to, for example, provide a compliant layer at an interface between the fibers and the matrix composed of subsequently introduced particles or components of the particle-containing slurry and molten alloy infiltrant to enhance toughness and crack deflection in the final composite article and/or to prevent reaction of the reinforcing fibers with the molten alloy infiltrant. Suitable coatings include, but are not limited to, carbon, aluminum nitride, boron nitride, silicon nitride, silicon carbide, boron carbide, metal borides, transition metal silicides, transition metal oxides, transition metal silicates, rare earth metal silicates and mixtures and combinations thereof. If used, in various embodiments the fiber coating has a thickness of about 0.05 μm to 15 μm, or about 0.1 μm to about 5 μm.

Once the preform is shaped and rigidized, a matrix material is incorporated into the preform. Methods for incorporating the matrix material may vary widely and include, for example, but are not limited to, injection molding, Polymer Infiltration and Pyrolysis (PIP), slip casting, and infiltration methods (e.g., chemical vapor infiltration, slurry infiltration and/or the like). In one non-limiting embodiment, this process includes applying to the preform a slurry having dispersed therein particles including, but not limited to, ceramic materials. As the slurry flows into the interstices between the inorganic fibers of the preform, the particles in the slurry substantially uniformly impregnate the pores of the preform and come to reside in the interstices between the preform fibers.

In various embodiments, the slurry utilized in the process of the present disclosure includes particles and a carrier liquid, and may optionally include a pre-gellant material, an optional gelation initiator or promoter, and additives.

In various embodiments, the particles in the slurry include aluminum nitride, aluminum diboride, boron carbide, aluminum oxide, mullite, zirconium oxide, carbon, silicon carbide, silicon nitride, transition metal nitrides, transition metal borides, rare earth oxides, and mixtures and combinations thereof. In some embodiments, the slurry may also contain a reactive additive composed of a source of Carbon such as Graphite, Carbon or Diamond particulate, or a high char-yielding resin.

The size of the particles may vary widely, and typically have a major dimension of less than about 50 μm. In various embodiments, the particles may have a wide variety of regular or irregular shapes including, for example, spheres, rods, disks, and the like. In various embodiments, the major dimensions of the particles may form a monomodal, a bimodal, or a multimodal distribution. In some embodiments, the particles are generally spheres with a diameter of less than about 50 μm, and the diameters of the particles make up a multimodal distribution to more effectively flow within the fibers of the preform and pack more densely within the pores of the preform.

The optional pre-gellant material may include any material that can be processed to form a gel-like network within the interstices of the fibers of the preform to evenly distribute and effectively retain the ceramic materials within the preform as the preform is subsequently processed. In this application the term gel refers to a viscous, jelly-like colloid including a disperse phase of the particles.

In one embodiment, the pre-gellant material includes a polysaccharide such as, for example, methyl cellulose, carboxymethyl cellulose, hydroxypropyl methyl cellulose, gellan gum, agarose, carrageenan, and mixtures and combinations thereof. In some embodiments, the slurry composition may optionally further include a gelation initiator or promoter such as a monovalent or a divalent salt.

In another embodiment, the pre-gellant material includes one or more gelation monomers which, when polymerized, form a gel within the pores of the preform. In various embodiments, the monomeric pre-gellant material may include, but are not limited to, acrylamides, acrylates, vinyls, allyls, and mixtures and combinations thereof. The gelation monomers may optionally include one, two, or more functional groups such as, for example, (meth)acryl, acrylamido, vinyl, allyl, and the like.

In some embodiments, the slurry can include an optional polymerization initiator to aid gelation of the pre-gellant material. The polymerization initiator may vary widely depending on the selected monomeric pre-gellant material, and in various example embodiments may include a peroxide, a persulfate, a perchlorate, an amine, an azo compound, and mixtures and combinations thereof.

In some embodiments, the monomeric pre-gellant material can include at least one first monomeric material that polymerizes to produce linear polymer chains, and a second monomeric material that polymerizes to produce cross-links between the linear polymer chains and further aid gelation. In one example embodiment, the first monomeric material can include N,N-dimethylacrylamide (DMAA, which produces linear polyacrylamide chains). The second monomeric material can include N,N'-methylenebisacrylamide (MBAM), which crosslinks between the linear chains.

The first and the second monomeric materials making up the monomeric pre-gellant material can be present in the slurry in any suitable ratio, and considerations in selecting the ratio include solubility in a selected slurry solvent, gelation temperatures, the desired viscosity of the slurry, consistency and viscosity of the resultant gelled slurry, gelation time, and the like. In one embodiment, the first monomeric material DMAA and the second monomeric material MBAM are present in the slurry at a ratio of about 1:1 to about 1:30.

In one example embodiment including first monomer DMAA and second monomer MBAM discussed above, a suitable polymerization initiator includes 2,2'-Azobis[2-(2-imidazoline-2-yl)propane]2HCl (AZIP). Other suitable examples include free radical initiators, but are not limited to ammonium persulfate/tetramethyl ethylene diamine (APS-TEMED), and azobis (2-amidinopropane) HCl (AZAP), and mixtures and combinations thereof.

The slurry also includes a carrier liquid or solvent selected to disperse or dissolve the monomeric pre-gellant material and the optional polymerization initiator. In various embodiments, the carrier liquid is aqueous (includes a major amount of water), or is water. Other carrier liquids that can be used in the slurry include, but are not limited to, alcohols.

In various embodiments, the slurry may optionally include less than about 10 wt % of additives such as, for example, dispersants, binders, surfactants, pH adjustors, and the like.

In various embodiments, the slurry can include about 30 wt % to about 90 wt % of particles, about 0.5 wt % to about 30 wt % of pre-gellant material, about 0.1 wt % to about 10 wt % of a polymerization initiator, about 0.25 wt % to about 20 wt % additives, and about 10 wt % to about 70 wt % water.

In various embodiments, the slurry includes a SiC solids content of about 60 wt % to about 80 wt %, and the SiC includes coarse spherical particles with a diameter of about 15 μm and fine spherical particles with a diameter of about 1 μm.

To make the slurry composition, the particles, the pre-gellant material, the carrier liquid, and any optional polymerization initiator or other additives are combined and optionally milled to ensure that the particles are dispersed and have an appropriate shape and size to most effectively flow, insert between, and lodge within the pores of the preform. Properties of the slurry such as, for example, pH, temperature, and the like may optionally be adjusted before, during, or after the milling process.

The preform is then immersed in the slurry composition. Prior to immersion, the preform fibers may optionally be prepared for slurry infiltration by exposing the fibers to a solution including, for example, water, carrier liquids, surfactants and the like to aid in the impregnation of the fibers. A vacuum may optionally be drawn prior to slurry introduction to purge gas from the preform and further enhance impregnation. The slurry infiltration may be conducted at any suitable temperature, and room temperature (about 20° C. to about 35° C.) has been found to be effective. The slurry infiltration may be enhanced by application of external pressure after slurry introduction, and a one atmosphere pressure gradient has been found to be effective.

Following slurry infiltration, the preform may optionally be heated. In one embodiment, the preform is heated to increase the rate at which the pre-gellant materials at least partially form a gel in the interstices between the preform fibers. The temperature selected to cause gel formation may vary widely depending on the pre-gellation materials and polymerization initiators (if any) selected for use in the slurry composition, but in some embodiments a temperature of about 30° C. to about 80° C., or about 35° C. to about 45° C., have been found to be suitable. The preform should be heated for a time sufficient to ensure that sufficient slurry gellation has occurred throughout the volume of the preform to maintain the ceramic particles within the pores of the preform during subsequent processing steps, and in various embodiments the temperature of the preform is maintained at the gellation temperatures discussed above for about 1 hour to about 4 hours, or about 2 hours to about 3 hours.

In some embodiments, after the slurry is sufficiently or fully gelled in the preform, excess gelled slurry is optionally removed from the fully slurry infiltrated preform. The excess gelled slurry can be removed from the preform by any suitable method, and mechanical surface treatment techniques like brushing or polishing with an abrasive article have been found to be suitable.

In some embodiments, prior to or following surface treatment, additional impregnation step(s) can be performed to ensure that the preform is fully impregnated with particles. The additional impregnation steps may be performed with the same or a different slurry composition as the initial impregnation step, or may include other materials such as, for example, a high char yielding resin, a pre-ceramic polymer, or mixtures thereof.

For example, a secondary slurry for use in the additional impregnation step(s) can include carbon black in a suitable solvent such polyvinylpyrrolidone, isopropanol, polyvinylalcohol, water, and mixtures thereof. In another non-limiting example, suitable high-char yielding resins can include phenolic flake dissolved in a suitable solvent such as an alcohol like isopropanol. In yet another non-limiting example, suitable pre-ceramic polymers can include polycarbosilane, polycarbosilazane, and mixtures and combinations thereof.

After the excess slurry is removed, the resulting cast is optionally at least partially dried to remove water or other solvents and form a green composite article. The drying may be conducted in any suitable manner, and in various example embodiments the cast can be dried at room temperature under vacuum at about 1 Torr, or may be dried at ambient pressure at a temperature of up to about 150° C. Increased drying temperatures may cause the gel to partially or fully decompose, and as such should be avoided.

Following the optional drying step, a molten metal alloy infiltrant is applied to a localized region of the green composite article. In various embodiments, the metal alloy infiltrant includes metalloids such as Si and B, and oxides thereof, as well as metals such as Al, Y, Ti, Zr, and oxides thereof, and mixtures and combinations thereof. In various embodiments, a localized region of a green composite article is heated with a heat source, and a metal alloy filler is melted and introduced into the heated localized region. The molten metal alloy filler gradually flows into and spreads throughout the interstitial regions of the supporting ceramic scaffold in the localized region of the green ceramic article. In some embodiments, capillary action further draws the molten filler into the localized region of the green ceramic article until a desired portion of the green composite article is adequately densified with the metal alloy.

In some embodiments, the localized region or the bulk of the green composite article may optionally be pre-heated prior to introduction of the metal alloy filler. While not wishing to be bound by any theory, presently available evidence indicates that pre-heating may in some cases minimize distortion of the article due to temperature variations.

In some embodiments, a first metal alloy infiltrant may be introduced into a first localized region of the green composite article, and a second metal alloy infiltrant different from the first alloy infiltrant may be introduced into a second region of the green composite article. The introduction of the second alloy infiltrant into the second region may be performed at the same time as the introduction of the first metal alloy infiltrant into the first region, or at a different time.

Referring to the schematic cross-sectional diagram of FIG. 1, in one non-limiting embodiment an exemplary green ceramic article 10 includes a woven ceramic fabric-like structure 11 with warp ceramic fibers 12 and weft ceramic fibers 14. A heat source 22 is moved about above a surface 15 of a localized region 16 of the CMC article 10, and heats the localized region to a target temperature. The heat source 22, or another heat source (not shown in FIG. 1), heat and melts a metal alloy infiltrant material 24. As the heat source 22 moves above the surface 15 of the localized region 16, a molten metal alloy infiltrant 26 enters the localized region 16 of the structure 11 and gradually flows into interstices 17 between the fibers 12, 14. In some embodiments, the molten infiltrant 26 is also wicked along the fibers 12, 14 by capillary action to further enhance infiltration. As the heat source 22 is moved in the direction of the arrow A and the molten infiltrant 26 is substantially continuously or discontinuously introduced into the localized region 16 of the structure 11, an advancing wave front 28 of the metal alloy infiltrant forms and moves in the direction A as the metal alloy infiltrant enters and occupies the interstices 17 between the fibers 12, 14.

Any heat source 22 can be used that is capable of sufficiently heating the region 16 to a target temperature sufficient to sustain the propagation of the wave front 28 until the localized region 16 of the structure 11 is adequately infiltrated with the metal alloy infiltrant. In various embodiments, the target temperature of the localized region of the green ceramic article is about 1400° C. to about 1600° C., or about 1400° C. to about 1500° C., or about 1420° C. to about 1470° C.

In some embodiments the heat source 22 can be used to melt the metal alloy infiltrant before or at the same time the localized region 16 of the structure is heated to the target temperature. In such embodiments the heat source 22 should also be capable of increasing the temperature of the metal alloy infiltrant 24 above its melt temperature in a commercially useful period of time to form a melted infiltrant 26 that can flow between the fibers 12, 14 of the structure 11 and occupy the interstices 17. Suitable examples include, but are not limited to, lasers, electrical arcs, electron beams, intense radiation sources, and microwave generators.

The heating of the localized region 16 should be conducted for a time sufficient to adequately fill and densify a desired portion of the region 16, or the entire region 16, with the molten alloy infiltrant, and of course will depend on factors including, but not limited to, the melt temperature of the metal alloy infiltrant, the size and shape of the region 16, the location of the region 16 within the green CMC article, and the energy output of the heat source 22. In various embodiments with the alloy materials listed above, suitable heating times should be about 2 seconds to about 5 minutes, or about 2 seconds to about 30 seconds, or about 2 seconds to about 10 seconds. Since a localized region of the green composite article is heated rapidly and directly, the speed and energy efficiency of the infiltration process in that region can be improved. Further, process parameters such as, for example, the temperatures of the filler and the region, and the rate at which the filler is introduced into the region, can be modified locally during the infiltration process to more fully fill regions of the green composite article that are difficult to infiltrate.

In some embodiments, the heating process described above can be conducted in an inert environment at atmospheric pressure, which can reduce vaporization of the metal alloy infiltrant during the infiltration process and thereby enhance efficiency. Suitable inert gases include, but are not limited to, Argon and Nitrogen.

Referring again to FIG. 1, as the infiltrant wavefront 28 advances through the region 16 of the structure 11, the molten metal alloy flows between the ceramic particles and fiber scaffold 12, 14 in the green composite article and occupies the interstices 17 between the particles until the desired portion of the green composite article 10 is fully densified. In various non-limiting embodiments, the green composite article 10 is densified to less than about 5%, or less than about 3%, or less than about 1%, porosity to form a CMC article.

The apparatus of FIG. 1 is sufficient to adequately fully infiltrate smaller regions of a green ceramic article, or articles with simple geometries. However, to ensure sufficient infiltration in larger regions of a part or regions with more complex geometries, a robotic rastering system could be used to manipulate one or more heat and metal infiltrant sources with respect to the surface of a portion of the green ceramic article to be filled.

In some embodiments, the CMC article can optionally be subjected to additional thermal treatments in a furnace following the completion of the infiltration process to anneal out microstresses introduced during the melt infiltration process.

In various embodiments, the final composite article includes about 20 vol % to 60 vol % coated fiber, or about 30 vol % to 50 vol %; about 1 vol % to 79 vol % infiltrated particles, or about 35 vol % to about 60 vol %; and about 1 vol % to about 79 vol % infiltrated alloy, or about 5 vol % to about 20 vol %. The CMC article includes no macroscopic porosity, which in this application means pores with an average pore size of less than about 200 μm, or less than about 50 μm, or less than about 2 μm, and includes a porosity of less than about 5%, or less than about 3%, or less than about 1%.

The CMC article may optionally be machined to form a suitable part for use in for example, a turbine engine or an aircraft engine.

The invention will now be described with reference to the following non-limiting example.

EXAMPLES

A green CMC article approximately 1.5 inches×1.5 inches×approximately 0.2 inches was fabricated using the aforementioned process by stacking 2-D woven cloth plys and pressing to form a fiber preform, coating the preform with a Boron Nitride fiber coating and rigidizing with Silicon Carbide using Chemical Vapor Infiltration. The rigidized porous body was infiltrated with an aqueous tri-modal Silicon Carbide slurry containing a pre-gellant material, and then heated to gel the infiltrated slurry. The green article was then dried at 150° C. for about 2 hours.

The green article was locally heated under flowing Argon using a Tungsten Inert Gas (TIG) welder at a current of approximately 150 Amps for approximately 10 seconds. Silicon was introduced in the form of large granules and the part was continuously heated until the molten metal was observed to infiltrate into the porous body which took an additional 5-10 seconds. Silicon was continuously added until no additional metal would infiltrate into the body and a small amount of excess was present on the surface. In this instance no direct temperature measurement was used, but a pyrometer would be an effective means of measuring the local temperature; based on the radiation wavelength it is estimated that the specimen was heated to approximately 1500-1550° C.

Figure 2B:
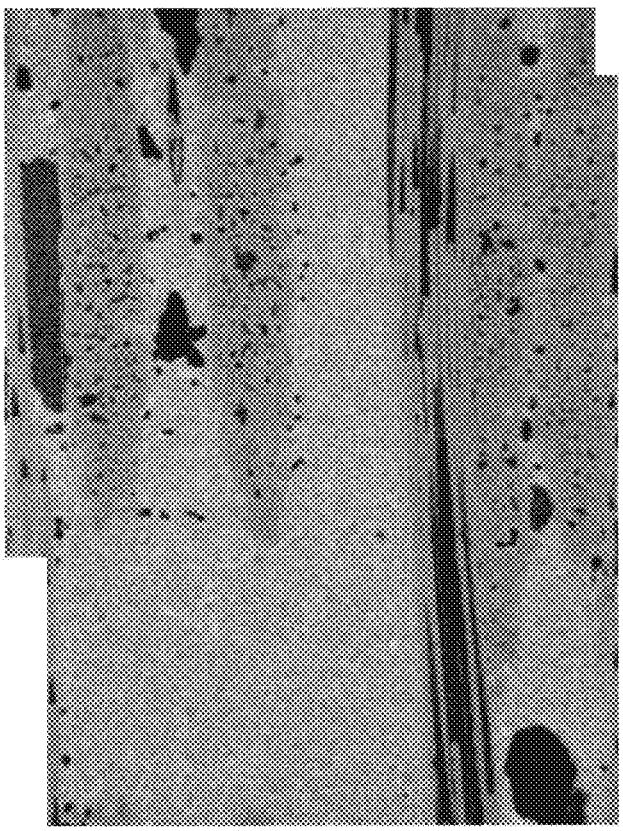
FIGS. 2A-2B are photographs of a cross-section of a CMC article made according to Example 1.
Figure 2A:
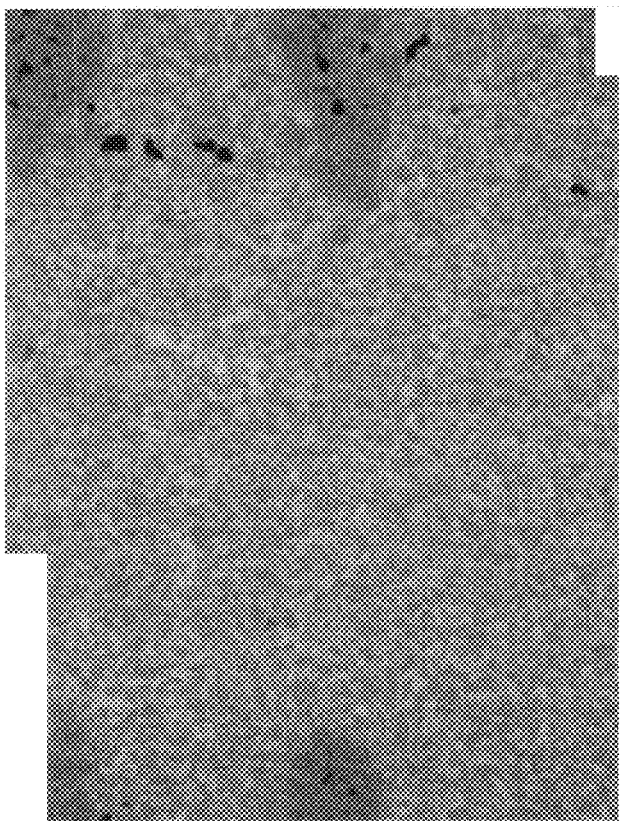

FIGS. 2A-2B are photographs at different magnifications of cross-sections of the finished part made using according to the example above.

Various embodiments of the invention have been described. These and other embodiments are within the scope of the following claims.

The invention claimed is:

1. A method of repairing a defect in a localized region of a green ceramic matrix composite (CMC) article, the localized region comprising a portion of the CMC article, and wherein the green CMC article comprises a woven, fabric ceramic reinforcing structure, the method comprising:
    moving a heat source above a surface of the localized region of the green CMC article to heat only the localized region of the green CMC article to a temperature to 1400° C. to 1600° C., wherein the localized region of the green CMC article is heated by the heat source for 2 seconds to 30 seconds;
    melting a metal alloy infiltrant to form a molten metal alloy; and
    introducing the molten metal alloy into the localized region to infiltrate the woven, fabric ceramic reinforcing structure of the green CMC article with the metal alloy infiltrant and densify the localized region of the green CMC article and repair the defect.

2. The method of claim 1, wherein the metal alloy infiltrant comprises a metalloid chosen from Si, B, and oxides thereof metals chosen from Al, Y, Ti, Zr, oxides thereof; and mixtures and combinations thereof.

3. The method of claim 1, wherein the ceramic reinforcing structure comprises a ceramic material selected from the group consisting of aluminum oxide ($Al_2O_3$), mullite ($Al_6Si_2O_{13}$), zirconium oxide ($ZrO_2$), Boron Carbide ($B_4C$), carbon (C), graphite, silicon carbide (SiC), silicon carbon nitride, silicon nitride, and mixtures and combinations thereof.

4. The method of claim 3, wherein the ceramic material comprises fibers.

5. The method of claim 1, wherein the localized region and the metal alloy infiltrant are heated by at least one of a laser, an electric arc, an electron beam, and a microwave generator.

6. The method of claim 1, wherein the ceramic reinforcing structure comprises SiC fibers.

7. The method of claim 1, wherein the green CMC article is in an inert atmosphere.

8. The method of claim 1, wherein the green CMC article is at an atmospheric pressure.

9. The method of claim 1, further comprising pre-heating a bulk of the green CMC article prior to introducing the molten metal alloy into the localized region.

10. A method of repairing a first defect in a first localized region of green ceramic matrix composite (CMC) article, and a second defect in a second localized region of the green CMC article, wherein the first localized region is different from the second localized region, and the first defect is different from the second defect, and wherein the first and the second localized regions comprise respective first and second portions of the CMC article wherein the green CMC article comprises a ceramic reinforcing structure, the method comprising:

moving a heat source above a surface of the first localized region of the green CMC article to heat only the first localized region of the green CMC article to a temperature to 1400° C. to 1600° C., wherein the first localized region of the green CMC article is heated for 2 seconds to 5 minutes;

melting a first metal alloy infiltrant to form a first molten metal alloy;

introducing the first molten metal alloy into the first localized region to infiltrate the ceramic reinforcing structure therein and repair the first defect;

moving a heat source above a surface of the second localized region of the green CMC article to heat only the second localized region of the green CMC article, wherein the second localized region of the green CMC article is heated for 2 seconds to 5 minutes;

melting a second metal alloy infiltrant to form a second molten metal alloy, wherein the second metal alloy is different from the first metal alloy; and introducing the second molten metal alloy into the second localized region to infiltrate the ceramic reinforcing structure therein and repair the second defect.

* * * * *